ated curd intermittently for at least one cycle about a first closed conveying path until it develops, turning the curd during each cycle, and standing the curd during each cycle until it knits, and conveying developed curd for at least one cycle about a second closed conveying path until it heals. Prior to the healing step, developed curd may be fed to a mill and cut into pieces. Salt may be applied to the pieces by a blower during each cycle along the second conveying path. Each closed conveying path is formed by a pair of belt conveyors, one arranged beneath the other, and structure for elevating curd from the lower conveyor to the upper conveyor.

United States Patent [19]
Tate

[11] 3,881,035
[45] Apr. 29, 1975

[54] MANUFACTURING OF CHEESE
[76] Inventor: William H. Tate, 118 Hill St., Hannibal, Mo. 63401
[22] Filed: Mar. 12, 1974
[21] Appl. No.: 450,391

Related U.S. Application Data
[62] Division of Ser. No. 221,645, Jan. 28, 1972, Pat. No. 3,797,380.

[52] U.S. Cl. ............ 426/582; 99/464; 426/36; 426/491; 426/518
[51] Int. Cl. .................................... A23c 19/02
[58] Field of Search ............ 99/453, 456, 460, 461, 99/462, 463, 464; 426/36, 38, 361, 378, 491, 496, 518

[56]   References Cited
UNITED STATES PATENTS
3,394,011   7/1968   Richardson et al. ............ 426/36
3,543,403   12/1970   Speglie et al. ............ 426/361

OTHER PUBLICATIONS
Olsar, N. F., Automation in The Cheese Industry: A Review. J. Da. Sci. Vol. 53, No. 8 1970 (pp. 1144–1150) gF22138.

Primary Examiner—David M. Naff
Attorney, Agent, or Firm—Clarence A. O'Brien; Harvey B. Jacobson

[57]   ABSTRACT
Cheese is manufactured by conveying a separated curd intermittently for at least one cycle about a first closed conveying path until it develops, turning the curd during each cycle, and standing the curd during each cycle until it knits, and conveying developed curd for at least one cycle about a second closed conveying path until it heals. Prior to the healing step, developed curd may be fed to a mill and cut into pieces. Salt may be applied to the pieces by a blower during each cycle along the second conveying path. Each closed conveying path is formed by a pair of belt conveyors, one arranged beneath the other, and structure for elevating curd from the lower conveyor to the upper conveyor.

4 Claims, 8 Drawing Figures

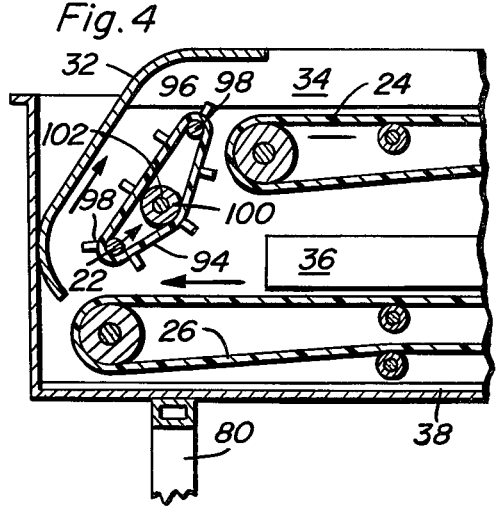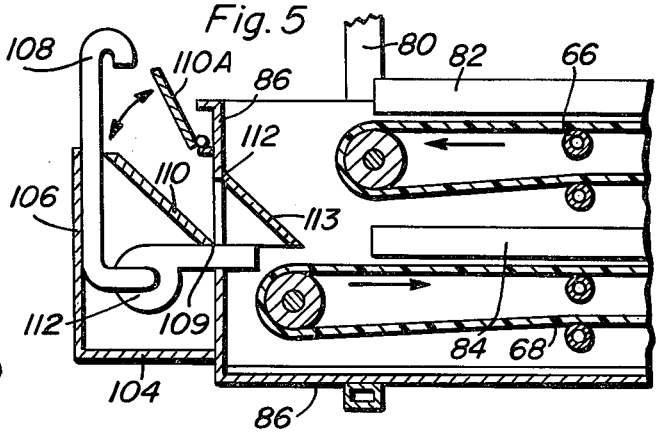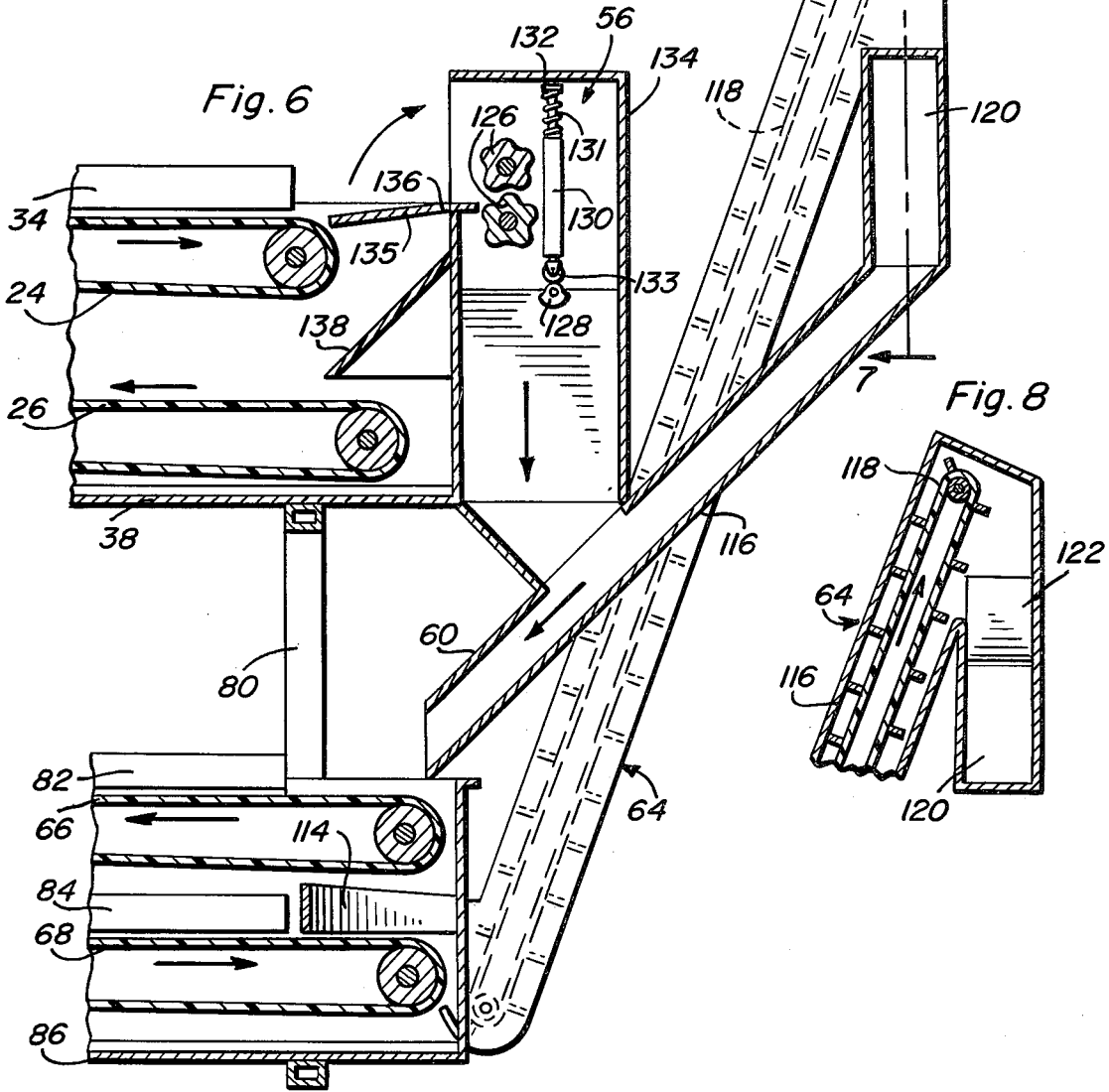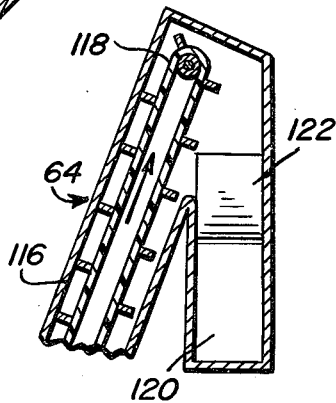

MANUFACTURING OF CHEESE

CROSS REFERENCE TO A RELATED APPLICATION

This is a division of application Ser. No. 221,645, filed Jan. 28, 1972, now U.S. Pat. No. 3,797,380.

BACKGROUND OF THE INVENTION

1. Field of the Invention

This invention relates to a method, and apparatus for carrying out the method, for manufacturing various types of cheeses in either continuous or batch operation.

2. Description of the Prior Art

It is known to use conveying systems in various stages of the manufacture of cheeses. These known systems, however, are usually directed to the performance of a particular stage in the manufacture of a particular cheese. Often these known systems are intended to replace the conventional method and apparatus for initially separating the curd from the whey. In addition, these known systems are generally difficult to clean, usually requiring the equipment to be dismantled at least in part for proper cleaning to be carried out.

SUMMARY OF THE INVENTION

It is an object of the present invention to provide a method for manufacturing various cheeses in either a continuous or batch operation. It is a further object of the present invention to provide a method which uses curd initially separated by conventional apparatus.

It is yet another object of the present invention to provide apparatus for carrying out the method according to the present invention, and for providing apparatus which may be cleaned in place without the necessity of dismantling any of the equipment.

These and other objects are achieved according to the present invention by providing a method for manufacturing cheese having the steps of conveying curd intermittently for at least one cycle about a first closed conveying path until it develops, turning the curd during each cycle until it knits, and conveying developed curd for at least one cycle about a second closed conveying path until it heals. The step of cutting developed curd into pieces may be performed prior to the healing step. In addition, a step of applying salt to the curd, or curd pieces, may be performed during each cycle about the second conveying path.

Apparatus for carrying out the method according to the present invention has first means for conveying curd for at least one cycle about a first closed conveying path until the curd develops, and second means for conveying developed curd for at least one cycle about a second closed conveying path until the curd heals.

In a preferred embodiment of apparatus according to the present invention, the first means includes first conveyor means for receiving curd and conveying same in a predetermined direction, second conveyor means arranged beneath the first conveyor means for receiving curd from the first conveyor means by means of the effect of gravity for conveying same in the direction opposite the predetermined direction, and means for transferring curd from the second conveyor means to the first conveyor means. The first and second conveyor means, and the means for transferring define the first closed conveyor path. The first means is operable intermittently for permitting the curd to stand and knit.

A preferred embodiment of the second means has upper conveyor means for receiving curd and conveying same in a predetermined direction, lower conveyor means arranged beneath the upper conveyor means for receiving curd from the upper conveyor means by means of the effect of gravity for conveying same in the direction opposite the predetermined direction, elevator means for receiving curd from the lower conveyor means and elevating same, and chute means for receiving curd from said elevator means and feeding same to the upper conveyor means. The upper and lower conveyor means, the elevator means, and the chute means define the lower closed conveying path. The curd is cycled in the lower conveying path until the curd heals. Means are preferably arranged between the elevator means and the chute means for removing healed curd from the lower conveying path.

Means are preferably provided for cutting into pieces developed curd received from the first means, and feeding the pieces to the second means. A preferred embodiment of the means for cutting has a pair of pusher rollers, an oscillatable cam, and a spring cutter screen vibrated by the cam.

To accomplish salting of the curd, means may be arranged adjacent the second conveying path for applying dry salt to the curd. This means for applying preferably has a blower for applying the salt under pressure.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a sectional view showing a detail of the apparatus of FIG. 1 and drawn to a larger scale.

FIG. 5 is a sectional view showing a detail of the structure of FIG. 1 and drawn to a larger scale.

FIG. 6 is a sectional view showing a detail of FIG. 1 and drawn to a larger scale.

FIG. 8 is a sectional view showing a detail of FIG. 6.

DESCRIPTION OF THE PREFERRED EMBODIMENT

Figure 1:
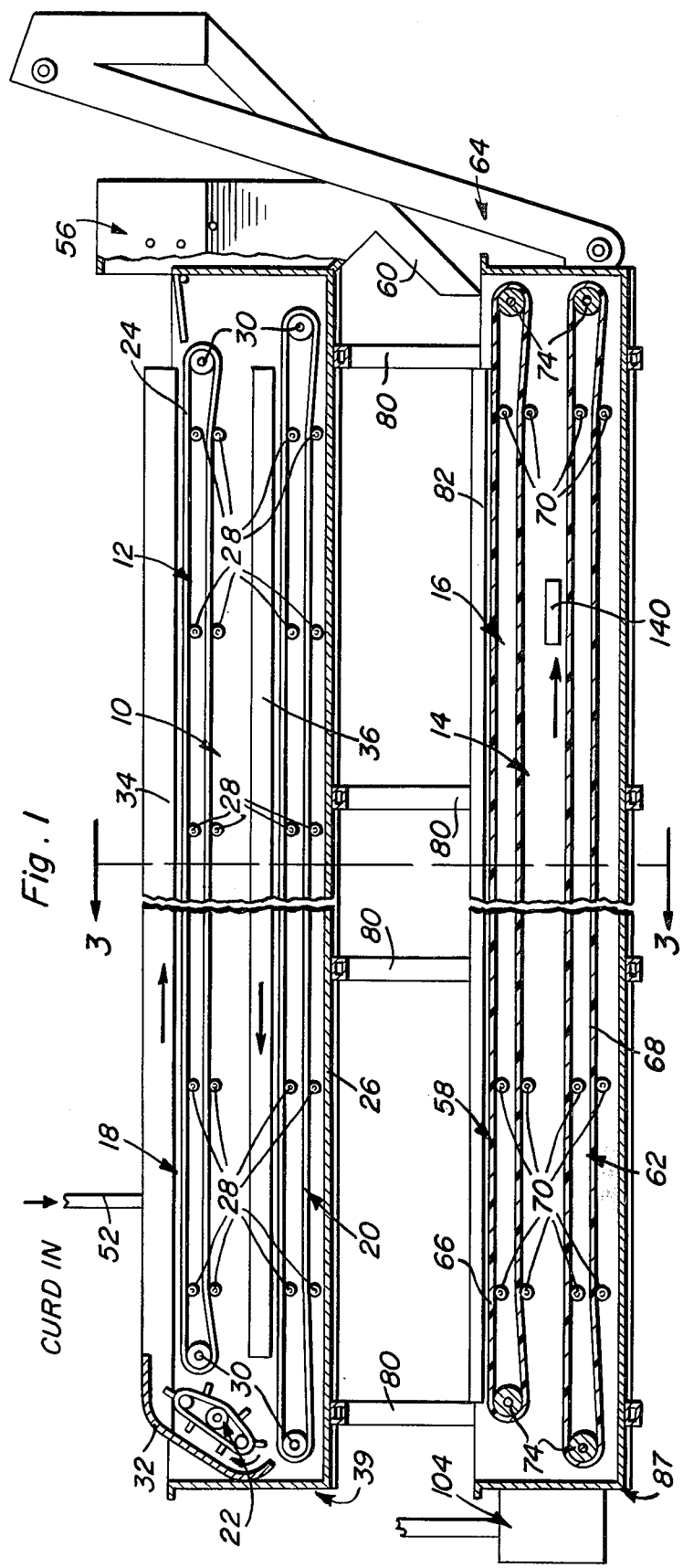
FIG. 1 is a vertical, longitudinal sectional view showing an apparatus for manufacturing cheese according to the present invention, and taken generally along the line 1—1 of FIG. 3.
Figure 2:
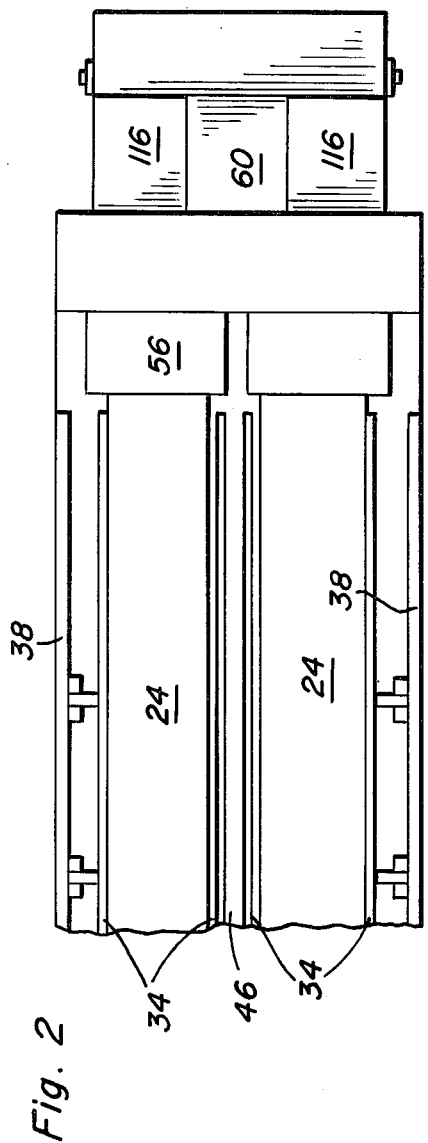
FIG. 2 is a fragmentary, top plan view of the structure shown in FIG. 1.
Figure 3:
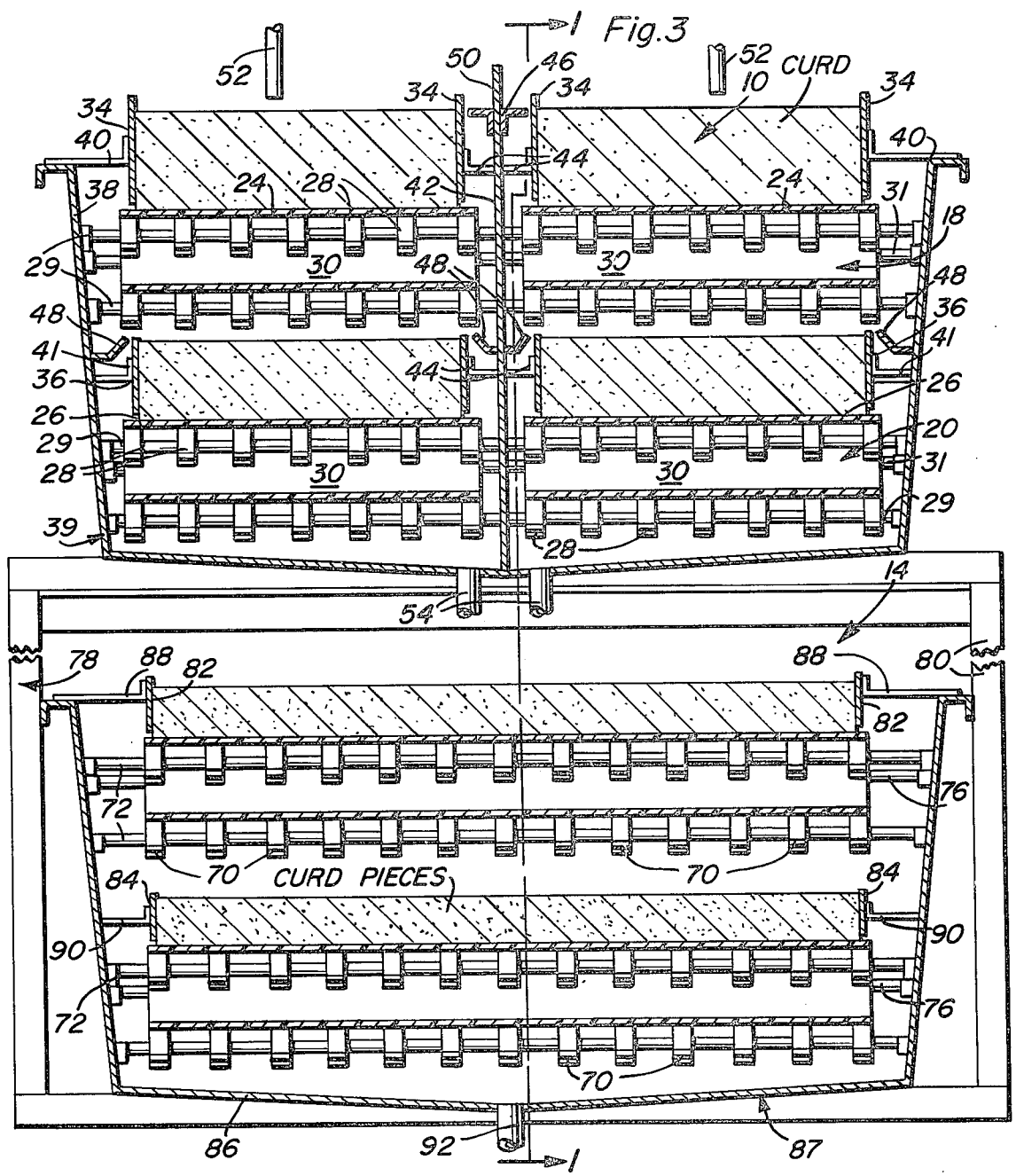
FIG. 3 is a sectional view taken generally along the line 3—3 of FIG. 1, drawn to a larger scale and having some members removed.

Referring first to FIGS. 1 to 3 of the drawings, an apparatus for manufacturing cheese according to the present invention has a first means 10 for conveying curd for at least one cycle about a first closed conveying path 12 until the curd develops, and a second means 14 for conveying developed curd for at least one cycle about a second closed conveying path 16 until the curd heals.

A preferred embodiment of the first means 10 has a first conveyor 18 for receiving curd and conveying same in a predetermined direction, as indicated by the arrow, and a second conveyor 20 arranged beneath first conveyor 18 for receiving curd from first conveyor 18 by means of the effect of gravity for conveying same in the direction opposite the predetermined direction. Arrows will indicate the direction of curd movement throughout the drawings. Means 22 for transferring curd from conveyor 20 to conveyor 18 completes means 10. Conveyors 18 and 20 and means 22 define conveyor path 12. Means 10 is operable intermittently for permitting the curd to stand and knit.

Conveyors 18 and 20 have belts 24 and 26, respectively, arranged on respective idle rollers 28 mounted on shafts 29 and a pair of head pulleys 30 mounted on shafts 31. One of head pulleys 30 for each conveyor 18, 20 is driven in a suitable, known manner (not shown). A baffle plate 32 is arranged adjacent one end of conveyors 18, 20, and forms part of means 22. Guide plates 34, 36 are arranged adjacent conveyors 18, 20, respectively. The outer guide plates 34, 36 are connected by brackets 40, 41 to walls 38 of a tank 39 in which conveyors 18, 20 are arranged. A divider 42 is connected to tank 39 in a suitable, known manner, and inner guide plates 34, 36 are attached to divider 42 by brackets 44. A flange 46 is mounted on the top of divider 42 for covering the space between plates 34. Trough portions 48 are connected to walls 38 and divider 42 for catching whey which is extracted from the curd. A skirt 50, which may be about 3 feet long, is mounted on top of flange 46 for separating the sections of conveyor 18. Hoses 52 are arranged over the sections of conveyor 18 adjacent skirt 50 for passing curd into belts 24 from a, for example, suitable, known solid liquid separator (not shown). Drainpipes 54 are provided in the bottom of tank 39 for passing extracted material out of tank 39. Means 56 may be arranged at the end of means 10 opposite that end at which means 22 is arranged for receiving developed curd from conveyor 18; for cutting same into pieces.

Means 14 has an upper conveyor 58 for receiving curd pieces from a chute 60 which is connected to means 56, and for conveying the curd pieces in a predetermined direction, a lower conveyor 62 arranged beneath conveyor 58 for receiving curd pieces from conveyor 58 by means of the effect of gravity for conveying same in the direction opposite the predetermined direction, and elevator means 64 for receiving curd pieces from conveyor 62 and elevating same. Conveyors 58, 62, elevator means 64, and chute 60 define conveying path 16. The curd pieces are cycled in conveying path 16 until the curd heals.

Conveyors 58, 62 have belts 66, 68, respectively, arranged on idle rollers 70 mounted on shafts 72, and head pulleys 74 mounted on shafts 76. Respective head pulleys 74 are driven in a suitable, known manner like that for conveyors 18, 20. Conveyors 58, 62 are arranged in a frame 78 which supports tank 39, and includes vertical columns 80. Guide plates 82, 84 are arranged adjacent the outer edges of belts 66, 68 and are mounted on the walls 86 of a tank 87 by brackets 88, 90. A drainpipe 92 is provided in the bottom of tank 87 for removing any extracted material. Shafts 72, 76 are mounted in walls 86 in a suitable, known manner.

FIG. 4 of the drawings shows the details of means 22. A belt 94 provided with projections 96 is mounted for movement on idle rollers 98 for rotation by a drive pulley 100. Drive pulley 100 is mounted on a shaft 102 which is mounted to walls 38 in a manner not shown. Rollers 98 are mounted to walls 38 and divider 42 in a similar manner, also not shown.

All of the belts used are preferably constructed from rubber or a suitable synthetic material.

FIG. 5 of the drawings shows means 104 for applying salt to the curd. It has a housing 106 attached to a wall 86 of tank 87. Dry salt is placed in salt hopper 110 which is covered by a lid 110a which is attached by hinges to housing 106. The air is supplied to blower 112 through air intake 108. Salt enters the pressurized air stream of the blower 112 through a controlled opening 109 for distribution of the salt onto the curd pieces on belt 68. A baffle 113 may be mounted on a wall 86 at the point where the salt is forced into tank 87 for deflecting the curd pieces onto belt 68.

Figure 7:
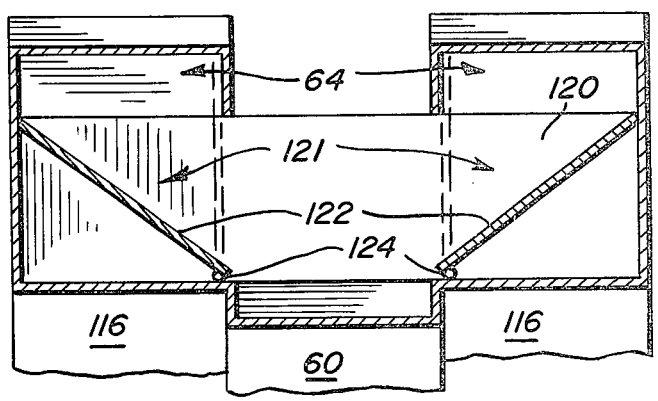
FIG. 7 is a sectional view taken generally along the line 7—7 of FIG. 6.

Referring now to FIGS. 6 to 8 of the drawings, a diverter 114 is arranged at the exit end of belt 68 for diverting the curd into chutes 116 of elevator means 64. A cleated conveyor 118 is arranged in chutes 116 for elevating the curd. Elevator means 64 has a trough 120 which is connected to chute 60. A means 121 is arranged between elevator means 64 and chute 60 for removing healed curd pieces (not shown) from chutes 116, and has a pair of doors 122 pivotally mounted as by hinges 124. When the doors are in the position shown in full lines in FIG. 7, the curd pieces will be returned to conveyor 58 via chute 60.

As can be seen from FIG. 6 of the drawings, means 56 for cutting the curd into pieces has a pair of pusher rollers 126, an oscillatable cam 128, and a spring cutter screen 130 arranged to be vibrated by cam 128. Screen 130 is mounted in a known manner on a rod 131 for movement with respect thereto against the bias of a coiled spring 132. A roller follower 133 is arranged at the opposite end of screen 130 for contact with cam 128. Rollers 126, cam 128, and rod 131 are arranged in a housing 134 and mounted to the walls thereof in a known manner. Housing 134 is provided with an opening arranged facing belt 24. A door 135 is pivotally mounted adjacent the opening as by a hinge 136. When door 135 is in the position shown in FIG. 6, curd will be passed from belt 24 into housing 134 to be fed into screen 130 by rollers 126. Screen 130 is, for example, a plurality of vertical and horizontal cutting wires (not shown). When door 135 is in a position closing the opening in housing 134, the curd falls under the force of gravity toward belt 26 and is deflected thereon by a baffle 138.

The controls for the various moving elements may be conventional speed varying controls known in the art. For example, variable speed motors may be used.

OPERATION

In the usual process of manufacturing cheese, milk is received at a temperature of approximately 40 degrees in either cans or bulk. Preferably, the milk is made into cheese the same day as it arrives or shortly thereafter. The milk is pasteurized at a temperature of 162 degrees, held for 15 seconds, immediately cooled to 86 degrees, and pumped into a regular cheese vat, to which a suitable, known starter, such as latic acid bacteria, has been added, and left in the vat for one hour. At this point, a soluble ferment called rennet is added to coagulate the protein and entrap the majority of the fat. This generally requires a time period of, for example, about 20 minutes. When this time period is over, the curd, or casein, is cut into approximately one-fourth inch cubes. After this has been done, paddles are inserted into the vat, and the curd is stirred at a slow speed for approximately 15 minutes. The speed must be slow enough to avoid breakage of curd. During this time period, the curd separates from the whey.

Both the curd and the whey are now cooked from a temperature of 86 degrees to a temperature of 102 degrees over a period of 30 minutes. Following this cooking, the curd and whey are agitated in a known manner for approximately 15 minutes. At this point, the agitators are stopped, the curd settles, and one half of the whey is removed. Then, the agitators are again turned on and allowed to run for half an hour. The remaining whey and the curd are now pumped together from the vat to a solid liquid separator, where the curd is separated from the whey. A untrifugal separator may be used. The whey is sent to a holding tank to be handled in a suitable manner, and the curd is discharged from the solid liquid separator.

When the method for manufacturing cheese according to the present invention is employed, the curd from the separator is conveyed intermittently for at least one cycle about the first closed conveying path 12 until it develops, means 22 turning the curd during each cycle by guiding it against baffle plate 32, and standing the curd during each cycle until it knits, or becomes consolidated. This is accomplished with the structure shown in the drawings by passing the curd through hose 52 onto belt 24, where it is moved to the right as seen in FIG. 1. When the curd reaches the end of belt 24, it drops onto belt 26, which is moving in the opposite direction. When the curd reaches the end of belt 26, the belt stops and the curd is left to stand on belts 24, 26 until it knits. There is also some whey expulsion during this time. After the curd knits, the belts 24, 26 are started in motion once again, and the curd on belt 26 is moved to belt 24 by means of belt 94 and baffle plate 32. The action of belt 94 and baffle plate 32 causes the curd to be turned over when it reaches belt 24. This eventually results in more whey expulsion, and the obtaining of the desired texture and body of the curd.

When the curd has developed properly, it is fed into means 56 where curd up to 8 inches thick is cut into cubes. By developed is meant the desired acidity, consistency, body and texture.

The curd pieces then drop into chute 60 from housing 134 and are passed onto belt 66, where it travels to the end of belt 66 and drops onto belt 68 due to the influence of gravity. During this time, the curd moves through a number of plows FIG. 1) 140 arranged along the top runs of belts 66, 68. Plows 140 may be mounted on divider 42 distributed a known manner (not shown) and may be plates or wedges. Plows 140 stir the curd, allow it to heal, and prevent it from matting together. At the end of belt 68, the curd moves onto conveyor 118 and is elevated to chute 60. Chute 60 will then transfer the curd pieces back to belt 66. During each cycle of the curd pieces in conveying path 16, means 104 may apply salt under pressure to the curd pieces as they pass from belt 66 to belt 68. When the curd pieces have healed and the salt has been properly distributed and incorporated into the healed curd pieces, doors 122 may be moved to the position shown by the broken lines in FIG. 7 and the curd pieces will then be removed from conveying path 16. The healed curd pieces may then be handled in a suitable, known manner, such as by being sent to a packaging machine (not shown).

During the continual movement of the curd pieces in conveying path 16, the curd pieces heal, salt is distributed under pressure onto the moving curd pieces, and more whey expulsion occurs. By healed is meant the desired moisture, consistency, and texture of the curd. These parameters may be determined by observation and known sampling techniques.

With the method and apparatus according to the present invention, the cycle time for the first and second conveying paths may be varied as a function of the particular cheese being manufactured. The conveyor speed of means 10 and 14 may be, for example, 3 feet per minute for conveyors 18, 20, and 6 feet per minute for conveyors 58, 62. The runs of belts 24, 26, 66 and 68 may be about 25 feet. Salt may be applied at a rate in the range of 3 to 20 applications per minute. An operator may periodically observe the condition of the curd in each of means 10, 12 to determine when the curd should be removed from the respective conveying path 12, 16.

Tanks 39, 87 are preferably constructed from, for example, stainless steel and watertight. This construction permits the complete immersion cleaning of the unit in place.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A method for manufacturing cheese, comprising the steps of:

a. placing curd on a first conveyor, and intermittently conveying same until the curd reaches an end of the first conveyor;

b. permitting the curd to fall from the end of the first conveyor onto a second conveyor positioned below the first conveyor, and intermittently conveying the curd on the second conveyor in a direction of movement opposite to the direction of movement of curd on the first conveyor until the curd reaches an end of the first conveyor;

c. elevating the curd from the end of the second conveyor to the first conveyor, and turning over the curd as same is elevated, the first and second conveyors forming a first closed conveying path;

d. repeating steps (a), (b), and (c) and allowing the curd to stand for sufficient periods between periods of intermittent conveying until the curd knits;

e. transferring the knitted curd from the first conveyor into a chute at the end of the first conveyor;

f. allowing the knitted curd to fall downward in the chute to a third conveyor partially forming a second closed conveying path, and conveying the curd on the third conveyor until it reaches the end of the third conveyor;

g. permitting the curd to fall onto a fourth conveyor positioned below the third conveyor, which fourth conveyor cooperates with the third conveyor to form the second closed conveying path, and conveying the curd on the fourth conveyor in a direction of movement opposite to the direction of movement of curd on the third conveyor until the curd pieces reach an end of the fourth conveyor;

h. elevating the curd from the end of the fourth conveyor to the third conveyor; and i. repeating steps (f), (g) and (h) until the curd heals.

2. A method as defined in claim 1, further including the step of cutting developed curd into pieces prior to step (f).

3. A method as defined in claim 2, further including the step of applying salt to the pieces during each cycle along the second conveying path.

4. A method as defined in claim 1, further including the step of applying salt to the curd during each cycle along the second conveying path.

* * * * *